(12) United States Patent
Hu et al.

(10) Patent No.: US 12,490,354 B2
(45) Date of Patent: Dec. 2, 2025

(54) LIGHTING COLOR-ADJUSTMENT CONTROL METHOD, DEVICE, PRODUCT, AND LAMP

(71) Applicant: Shenzhen Intellirocks Tech. Co., Ltd., Shenzhen (CN)

(72) Inventors: Weili Hu, Shenzhen (CN); Wenlong Wu, Shenzhen (CN)

(73) Assignee: Shenzhen Intellirocks Tech. Co., Ltd., Shenzhen (CN)

( * ) Notice: Subject to any disclaimer, the term of this patent is extended or adjusted under 35 U.S.C. 154(b) by 219 days.

(21) Appl. No.: 18/354,623

(22) Filed: Jul. 18, 2023

(65) Prior Publication Data

US 2024/0049372 A1    Feb. 8, 2024

(30) Foreign Application Priority Data

Aug. 8, 2022    (CN) .......................... 202210945025.3

(51) Int. Cl.
*H05B 45/20*    (2020.01)
*H05B 45/10*    (2020.01)
*H05B 45/325*    (2020.01)

(52) U.S. Cl.
CPC ............. *H05B 45/20* (2020.01); *H05B 45/10* (2020.01); *H05B 45/325* (2020.01)

(58) Field of Classification Search
CPC ........ H05B 45/10; H05B 45/14; H05B 45/18; H05B 45/20; H05B 45/24; H05B 45/28; H05B 45/30; H05B 45/32; H05B 45/325; H05B 47/10; H05B 47/105; H05B 47/11; H05B 47/155
See application file for complete search history.

(56) References Cited

U.S. PATENT DOCUMENTS

2014/0300283 A1*  10/2014  Lee .................... H05B 45/325
                                                    315/186

* cited by examiner

*Primary Examiner* — Long Nguyen
(74) *Attorney, Agent, or Firm* — Wenye Tan (57) ABSTRACT

A lighting color-adjustment control method is provided for a lamp containing at least one light-emitting unit, each having a plurality of color-light elements. The method includes: in response to a lighting color-adjustment instruction, determining a target color parameter including color values corresponding to the plurality of color-light elements; according to the target color parameter and a current color parameter, determining a first color-adjustment ratio coefficient of each color-light element; determining a unit color-adjustment value of each color-light element, the unit color-adjustment value of each color-light element being a result of a preset color-adjustment step length matched with a corresponding weight, and the weight including the first color-adjustment ratio coefficient; and synchronously controlling each color-light element to implement at least one color adjustment with the respective unit color-adjustment value to adjust each color-light element to emit a color light corresponding to the target color parameter.

19 Claims, 3 Drawing Sheets

LIGHTING COLOR-ADJUSTMENT CONTROL METHOD, DEVICE, PRODUCT, AND LAMP

CROSS-REFERENCES TO RELATED APPLICATIONS

This application claims priority to Chinese Patent Application No. CN202210945025.3, filed on Aug. 8, 2022, the content of which is hereby incorporated by reference in entirety.

FIELD OF THE TECHNOLOGY

The present disclosure relates to the technical field of lighting equipment control and, in particular, to a lighting color-adjustment control method, a lighting color-adjustment control device, a computer program product, and a lamp.

BACKGROUND OF THE DISCLOSURE

In general, the RGB (red, green, blue) three types of color light can be combined to form any color light. Therefore, in order to adjust the color of the light emitted by the lighting equipment, such as LED lights, three kinds of RGB light-emitting elements are usually provided in the lighting equipment, so that the LED lights can emit light of any color, improving the user's visual experience.

In the light color adjustment process, that is, in the gradual color change process of the light, the three RGB colors are usually adjusted with the same step length. However, because the proportions of the three RGB colors in the light of different colors are inconsistent, various intermediate colors are prone to appear in the color adjustment process, thereby affecting the user's visual experience. For example, when adjusting the light emitted by an RGB lamp from orange (255, 127, 0) to blue (0, 0, 255), the three RGB colors are adjusted in the step length of 1, and the values of the RGB three primary colors are sequentially (255, 127, 0), (254, 126, 1), (253, 125, 2), . . . , (1, 0, 254), (0, 0, 255). Because the three RGB color lights are adjusted with the same step length during the color adjustment process, the RGB lamp sequentially produces a variety of gradient colors during the color adjustment process, which greatly affects the light effect during the color adjustment process and affects the visual experience.

In particular, when the three RGB colors need to be changed in different values, and the three RGB colors are adjusted with the same step length, it is easy to for one of the color lights to complete the adjustment, while the other one or two color lights have not completed the color adjustment. Thus, the RGB lamp can emit a variety of gradient colors during the adjustment process, which will affect the user's visual experience. For example, when the RGB lamp light is gradually adjusted from orange color (255, 127, 0) to black color (0, 0, 0), the color will gradually be transited to red (128, 0, 0), and then from red (128, 0, 0) to black. Therefore, when the three RGB colors are all adjusted with the same step length, because the color values need to be adjusted for each color light are different, the numbers of adjustments of each color light are inconsistent, so that the RGB lamp will appear in multiple colors during the adjustment process, thereby affecting the user's visual experience.

The disclosed methods and apparatus are directed to solve one or more problems set forth above and other problems.

SUMMARY

The present disclosure provides a lighting color-adjustment control method, device, product, and lamp.

According to one aspect of the present disclosure, a lighting color-adjustment control method is provided for a lamp containing at least one light-emitting unit, each having a plurality of color-light elements. The method includes: in response to a lighting color-adjustment instruction, determining a target color parameter corresponding to the lighting color-adjustment instruction, the color parameter including color values corresponding to the plurality of color-light elements; according to the target color parameter and a current color parameter corresponding to the plurality of color-light elements, determining a first color-adjustment ratio coefficient of each color-light element; determining a unit color-adjustment value of each color-light element, the unit color-adjustment value of each color-light element being a result of a preset color-adjustment step length matched with a corresponding weight, and the weight including the first color-adjustment ratio coefficient; and synchronously controlling each color-light element to implement at least one color adjustment with the respective unit color-adjustment value to adjust each color-light element to emit a color light corresponding to the target color parameter.

According to another aspect of the present disclosure, a lamp is provided. The lamp includes a dimmer; a control unit; and a plurality of light-emitting units. The dimmer is used to output a lighting color-adjustment instruction to the control unit, each light-emitting unit includes a plurality of color-light elements, the control unit is electrically connected to each color-light element of the light-emitting units, and the control unit is configured to perform: in response to a lighting color-adjustment instruction, determining a target color parameter corresponding to the lighting color-adjustment instruction, the color parameter including color values corresponding to the plurality of color-light elements; according to the target color parameter and a current color parameter corresponding to the plurality of color-light elements, determining a first color-adjustment ratio coefficient of each color-light element; determining a unit color-adjustment value of each color-light element, the unit color-adjustment value of each color-light element being a result of a preset color-adjustment step length matched with a corresponding weight, and the weight including the first color-adjustment ratio coefficient; and synchronously controlling each color-light element to implement at least one color adjustment with the respective unit color-adjustment value to adjust each color-light element to emit a color light corresponding to the target color parameter.

According to another aspect of the present disclosure, a non-transitory computer-readable storage medium is provided. The non-transitory computer-readable storage medium contains computer-executable program codes for, when executed by one or more processors, performing a lighting color-adjustment control method for a lamp containing at least one light-emitting unit, each having a plurality of color-light elements. The method includes: in response to a lighting color-adjustment instruction, determining a target color parameter corresponding to the lighting color-adjustment instruction, the color parameter including color values corresponding to the plurality of color-light elements; according to the target color parameter and a current color parameter corresponding to the plurality of color-light elements, determining a first color-adjustment ratio coefficient of each color-light element; determining a unit color-adjustment value of each color-light element, the unit color-adjustment value of each color-light element being a result of a preset color-adjustment step length matched with a corresponding weight, and the weight including the first color-adjustment ratio coefficient; and synchronously controlling each color-light element to implement at least one color adjustment with the respective unit color-adjustment value to adjust each color-light element to emit a color light corresponding to the target color parameter.

Other aspects of the present disclosure can be understood by those skilled in the art in light of the description, the claims, and the drawings of the present disclosure.

BRIEF DESCRIPTION OF THE DRAWINGS

To describe the technical solutions of the embodiments of the present disclosure more clearly, the following briefly introduces the accompanying drawings used for describing the disclosed embodiments. Apparently, the accompanying drawings in the following description show merely some embodiments of the present disclosure, and a person of ordinary skill in the technology may derive other drawings from these accompanying drawings without creative efforts.

DETAILED DESCRIPTION

The following describes exemplary embodiments in detail, and examples of the embodiments are shown in the accompanying drawings, so as to better understand the present disclosure. Unless otherwise specified, a same number in different drawings may represent a same or similar element. The implementations described in the disclosed embodiments below do not represent all implementations consistent with the present disclosure, but are merely examples of the apparatus and the methods that are consistent with some aspects of the present disclosure, and should not be used for limiting the present disclosure. Further, as long as there is no conflict, the embodiments of the present disclosure and features of the embodiments may be combined with each other.

Those skilled in the art will understand that unless otherwise stated, the singular forms "a", "an", "said" and "the" used herein may also include plural forms. It should be further understood that the word "comprising" used in the description of the present disclosure refers to the presence of said features, integers, steps, operations, elements and/or components, but does not exclude the presence or addition of one or more other features, integers, steps, operations, elements and/or components, but does not preclude the presence or addition of one or more other features, integers, steps, operations, elements, components and/or groups thereof. It will be understood that when an element is referred to as being "connected" or "coupled" to another element, it can be directly connected or coupled to the other element or intervening elements may also be present. Additionally, "connected" or "coupled" as used herein may include wireless connection or wireless coupling. The expression "and/or" used herein includes all or any elements and all combinations of one or more associated listed items.

Those skilled in the art can understand that, unless otherwise defined, all terms (including technical terms and scientific terms) used herein have the same meaning as commonly understood by those of ordinary skill in the art to which this invention belongs.

The present disclosure provides a method for controlling lighting color-adjustment. When a light-emitting unit adjusts the color of the light emitted by the light-emitting unit, each color-light element that makes up the light-emitting unit is adjusted using a unit color-adjustment value, which is determined according to the difference between the target color and the current color of the color-light element during the color adjustment process. Using the corresponding unit color-adjustment value, each color-light element can complete the color adjustment process in the same number of color adjustments (or adjustment steps), such that the light-emitting unit completes the overall color adjustment, avoiding such scenarios where, after one or more color-light elements complete the color adjustment, other color-light element(s) still has not completed the color adjustment, which may cause various changing colors appearing in the light-emitting unit during the color adjustment process, affecting the visual experience.

Figure 1:
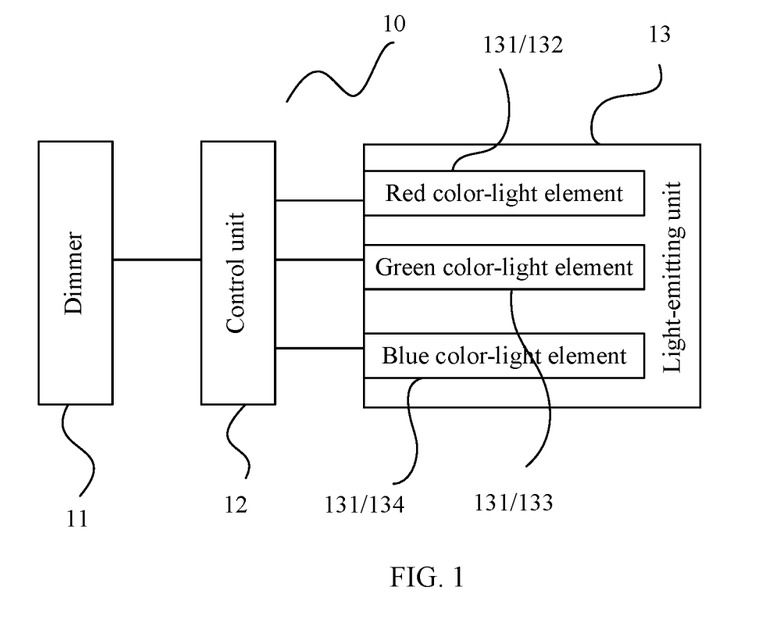
FIG. 1 illustrates a schematic circuitry diagram of a lamp according to an embodiment of the present disclosure.

In certain embodiments of the present disclosure, the lighting color-adjustment control method is implemented based on a lamp 10, referring to FIG. 1. The lamp 10 may include a dimmer 11, a control unit 12, and one or more light-emitting units 13. The dimmer 11 may be electrically connected to the control unit 12, and the control unit 12 may be electrically connected to the light-emitting units 13, respectively.

More specifically, a light-emitting unit 13 may include a plurality of color-light elements 131, and the plurality of color-light elements 131 respectively emit color light of different colors, and the color light emitted by each of the plurality of color-light elements 131 can be combined to form light of any color. That is to say, the light-emitting unit 13 can emit light of any color.

In one embodiment of the present disclosure, the light-emitting unit 13 may include three color-light elements 131. The three color-light elements 131 are respectively a red-light (or red) color-light element 132, a green-light (or green) color-light element 133, and a blue-light (or blue) color-light element 134. The red-light color-light element 132 is used to emit red color light, the green-light color-light element 133 is used to emit green color light, and the blue-light color-light element 134 is used to emit blue color light. The color value of color light emitted by each of the three color-light elements 131 of the light-emitting unit 13 can be adjusted, and then combined to form light of any color. In one embodiment, the light-emitting unit 13 is an LED lamp.

The dimmer 11 may be used to output a lighting color-adjustment instruction to the control unit 12, and the control unit 12 controls the corresponding light-emitting unit 13 to emit light of a corresponding color after receiving the lighting color-adjustment instruction. In one embodiment, the dimmer 11 is a computer or similar component, and the user can issue a lighting color-adjustment instruction to the control unit 12 through the dimmer 11 to control the light-emitting unit 13 to change the color of the emitted light.

More specifically, after the control unit 12 receives the lighting color-adjustment instruction, the control unit 12 determines a target color parameter corresponding to the light-emitting unit 13 from the lighting color-adjustment instruction. Further, the control unit 12 obtains the current color parameter of the light-emitting unit 13 and, based on the target color parameter and the current color parameter, determines the color value to be adjusted for each color-light element 131. The control unit 12 also calculates a unit color-adjustment value of each color-light element 131 of the light-emitting unit 13 during each color adjustment step. Afterwards, the control unit 12 controls each color-light element 131 to perform at least one color adjustment step based on the unit color-adjustment value corresponding to each color-light element 131, so that the color-light element 131 adjusts its color value to the target color value, and the light-emitting unit 13 adjusts its overall color value to the target color value, i.e., the color of the emitted light of the light-emitting unit 13 is adjusted to the target color. In one embodiment, the control unit 12 is at least one control chip of the light-emitting unit 13.

Details for the specific color adjustment method of each color-light element of the light-emitting unit may be described further below.

The lighting color-adjustment control method is implemented based on the lamp described above. Specifically, referring to FIG. 2, the lighting color-adjustment control method may include the following steps.

Figure 2:
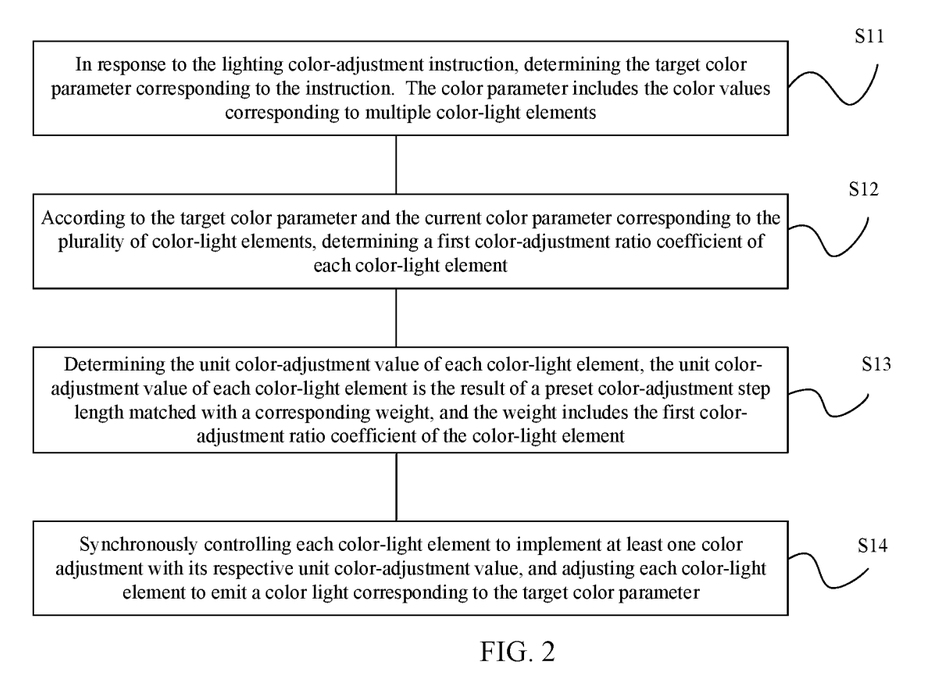
FIG. 2 illustrates a schematic flow chart of a lighting color-adjustment control process according to an embodiment of the present disclosure.

Step S11, in response to the lighting color-adjustment instruction, determining the target color parameter corresponding to the instruction. The color parameter includes the color values corresponding to multiple color-light elements.

The dimmer may output a lighting color-adjustment instruction to the control unit. After receiving the lighting color-adjustment instruction, the control unit determines the target color parameter of the corresponding light-emitting unit from the lighting color-adjustment instruction, and the target color parameter include the color values of the multiple color-light elements of the light-emitting unit. In one embodiment, the target color parameter is expressed in the form of numerical values, including the RGB numerical values. Among the RGB values, the R value is the target color value of the red color-light element of the light-emitting unit, the G value is the target color value of the green color-light element of the light-emitting unit, and the B value is the target color value of the blue color-light element of the light-emitting unit. When the three color-light elements of the light-emitting unit are respectively adjusted to the target color values, the color of the light emitted by the light-emitting unit corresponds to the target color values included in the lighting color-adjustment instruction.

Step S12, according to the target color parameter and the current color parameter corresponding to the plurality of color-light elements, determining a first color-adjustment ratio coefficient of each color-light element.

After the control unit obtains the corresponding target color value of each color-light element of the light-emitting unit by analyzing the lighting color-adjustment instruction, the control unit obtains the current color value of each color-light element of the light-emitting unit, and the current color value refers to the color value of the light currently emitted by the color-light element. The control unit obtains the color difference value based on the difference between the current color value and the corresponding target color value of the color-light element. After the control unit obtains the corresponding color difference values of the color-light elements of the light-emitting unit, the control unit chooses one of the color difference values as a reference difference value.

Further, based on the reference difference value, the color difference value corresponding to each color-light element is used to calculate the first color-adjustment ratio coefficient corresponding to each color-light element, and the first color-adjustment ratio coefficient is used to calculate the corresponding unit color-adjustment value of the corresponding color-light element during the color adjustment process, so that each color-light element performs the same number of color adjustments during the color adjustment process. This can prevent one or more of the color-light elements from completing the color adjustment in advance of other color-light elements, causing various color changes of the light emitted by the light-emitting unit during the color adjustment process, and affecting the visual effect of the light emitted by the light-emitting unit.

Figure 3:
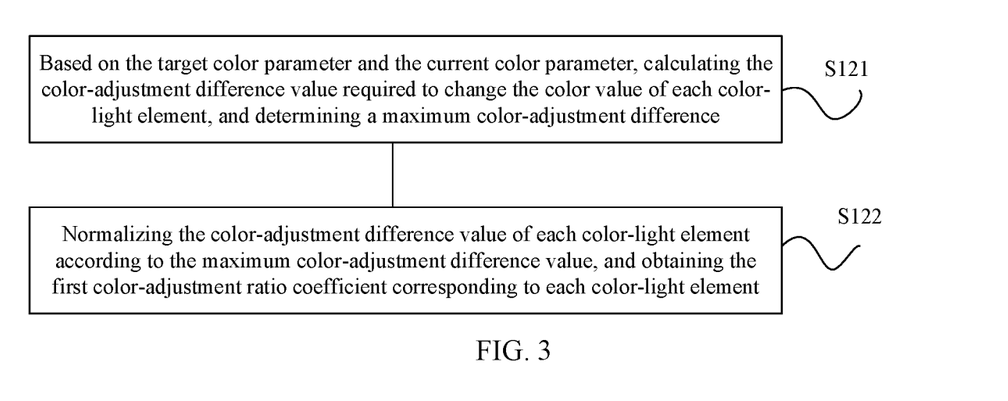
FIG. 3 illustrates a schematic flowchart of Step S12 of the lighting color-adjustment control process according to an embodiment of the present disclosure.

Specifically, with reference to FIG. 3, Step S12 may include the following steps.

Step S121, based on the target color parameter and the current color parameter, calculating the color-adjustment difference value required to change the color value of each color-light element, and determining a maximum color-adjustment difference.

After the control unit acquires the target color parameter corresponding to the light-emitting unit from the lighting color-adjustment instruction, the target color parameter include the target color value of each color-light element of the light-emitting unit. For example, the target color parameter of the light-emitting unit is the target color value Di(r1, g1, b1), that is, the target color value of the red color-light element of the light-emitting unit is r1, the target color value of the green color-light element of the light-emitting unit is g1, and the target color value of the blue color-light element of the light-emitting unit is b1.

The control unit further acquires the current color parameter of the light-emitting unit, i.e., the color parameter of the light currently emitted by the light-emitting unit. The current color parameter includes the current color value of each color-light element of the light-emitting unit. For example, the current color parameter of the light-emitting unit is the current color value Ci(r2, g2, b2), that is, the current color value of the red color-light element of the light-emitting unit is r2, the current color value of the green color-light element of the light-emitting unit is g2, and the current color value of the blue color-light element of the light-emitting unit is b2.

Further, based on the target color value and the current color value of each color-light element, the control unit calculates the difference between the current color value and the target color value, which is called the color-adjustment difference value, that is, the color value that needs to be changed to the target color value from the current color value of the color-light element. For example, for the color-adjustment difference Ai(r1−r2, g1−g2, b1−b2) of the three color-light elements of the light-emitting unit, where r1−r2 is the color-adjustment difference of the red color-light element, g1−g2 is the color-adjustment difference of the green color-light element, and b1−b2 is the color-adjustment difference of the blue color-light element.

The control unit may convert the color-adjustment difference values corresponding to each color-light element into absolute values, and selects the color-adjustment difference value with the largest value from the absolutized color-adjustment difference values, and refers the color-adjustment difference value with the largest value to be the maximum color-adjustment difference value. For example, the target color parameter of the lighting unit is D1(255, 180, 0), and the current color value is C1(0, 255, 192), then the color-adjustment difference value A1 is (|255-0|, |180-255|, |0-192|), that is, the color-adjustment difference value is A1(255, 75, 192), and the maximum color-adjustment difference value is MAX1=255.

Step S122, normalizing the color-adjustment difference value of each color-light element according to the maximum color-adjustment difference value, and obtaining the first color-adjustment ratio coefficient corresponding to each color-light element.

After the control unit obtains the color-adjustment difference value corresponding to each color-light element of the light-emitting unit and the maximum color-adjustment difference value, the control unit calculates the first color-adjustment ratio coefficients corresponding to each color-light element based on the color-adjustment difference value corresponding to each color-light element and the maximum color-adjustment difference value. The corresponding first color-adjustment ratio coefficients of the multiple color-light elements are the same or different. Further, the first color-adjustment ratio coefficients are normalized so that the first color-adjustment ratio coefficients are readable values. In one embodiment, the first color-adjustment ratio coefficient is obtained using division calculation or variance calculation or standard deviation calculation.

In one embodiment, Step S12 also includes Step S123, dividing the color-adjustment difference value of each color-light element by the maximum color-adjustment difference value to obtain the corresponding first color-adjustment ratio coefficient, and normalizing all the first color-adjustment ratio coefficients to a value space of [0, 1].

That is, the color-adjustment difference value corresponding to each color-light element is divided by the maximum color-adjustment difference value to obtain the first color-adjustment ratio coefficient corresponding to each color-light element. In order to facilitate the understanding of the first color-adjustment ratio coefficient, the first color-adjustment ratio coefficient is normalized to the value space of [0, 1]. For example, the color difference value of the light-emitting unit is A1(255, 75, 192), the maximum color-adjustment difference value is MAX1=255, and the first color-adjustment ratio coefficient corresponding to the light-emitting unit is (255/255, 75/255, 192/255), that is, the first color-adjustment ratio coefficient of the red color-light element is 255/255, the first color-adjustment ratio coefficient of the green color-light element is 75/255, and the first color-adjustment ratio coefficient of the blue color-light element is 192/255.

Step S13, determining the unit color-adjustment value of each color-light element, the unit color-adjustment value of each color-light element is the result of a preset color-adjustment step length matched with a corresponding weight, and the weight includes the first color-adjustment ratio coefficient of the color-light element.

After the control unit obtains the first color-adjustment ratio coefficient corresponding to each color-light element of the light-emitting unit, the control unit determines a weight corresponding to each color-light element, and the weight is used to match the preset color-adjustment step length to obtain the unit color-adjustment value corresponding to each color-light element. The unit color-adjustment value of the color-light element is correlated with multiple color-light elements of the same light-emitting unit through the first color-adjustment ratio coefficient, so that the color-light elements of the light-emitting unit can be correlated with each other during the color adjustment process. Thus, the number of times of the color adjustments (or the number of the color adjustment steps) of each color-light element is the same, so that each color-light element can complete the color adjustment at the same time, avoiding the gradual color change of multiple light-emitting units of the lamp during the color adjustment process, affecting visual effects.

The unit color-adjustment value is the color-adjustment value of the color-light element for each color adjustment step. When the color-light element changes from the current color value to the corresponding target color value, the color needs to be adjusted one or more times, and every time the color adjustment is changed by the corresponding unit color-adjustment value. The color-adjustment step length is allocated to each color-light element of the light-emitting unit, and the multiple color-light elements of the light-emitting unit all correspond to the same color adjustment step length. The color-adjustment step length is preset by the control unit, or the color-adjustment step length is sent to the control unit by the dimmer through the lighting color-adjustment instruction. The unit color-adjustment value belongs to an integer value space of 0 to 255, and the color-adjustment step length belongs to an integer value space of 1 to 20.

More specifically, the weight is multiplied by the color-adjustment step length to obtain the unit color-adjustment value of the corresponding color-light element.

In one embodiment of the present disclosure, the first color-adjustment ratio coefficient is the weight value of the weight, and the unit color-adjustment value of the color-light element is obtained by multiplying the color-adjustment step length and the corresponding first color-adjustment ratio coefficient. For example, the first color-adjustment ratio coefficient corresponding to the light-emitting unit is (255/255, 75/255, 192/255), and the preset color-adjustment step length is 10, then the unit color-adjustment value of each color-light element of the light-emitting unit is (255/255*10, 75/255*10, 192/255*10), which is (10, 3, 7.5). Specifically, the unit color-adjustment value of the red color-light element is 10, the unit color-adjustment value of the green color-light element is 3, and the unit color-adjustment value of the blue color-light element is 7.5.

In one embodiment, the weight further includes a second color-adjustment ratio coefficient, and the second color-adjustment ratio coefficient is correlated with a plurality of light-emitting units of the lamp, so that the color adjustment process of a single light-emitting unit is consistent with the color adjustment process of the plurality of light-emitting units of the lamp. Thus, the color of the multiple color-light elements of the plurality of light-emitting units of the lamp are adjusted for the same number of times, so as to avoid gradual color changes in the color-adjustment process of the lamp, affecting the effect of light emitted by the lamp. Specifically, referring to FIG. 4, by calculating the second color-adjustment ratio coefficient, the weight value of the weight is calculated based on the second color-adjustment ratio coefficient and the first color-adjustment ratio coefficient, and then the unit color-adjustment value is calculated, specifically, including the following steps.

Figure 4:
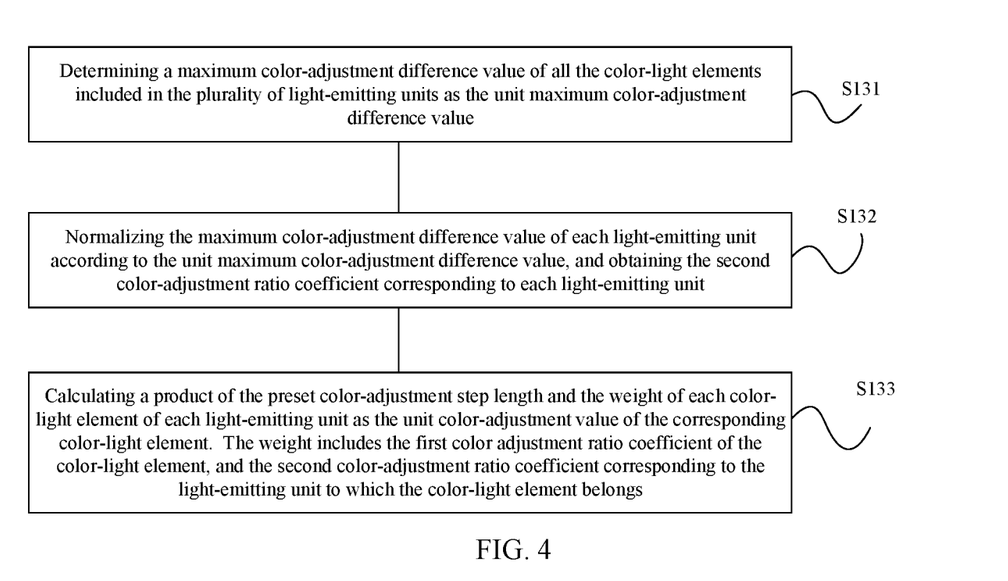
FIG. 4 illustrates a schematic flowchart of Step S13 of the lighting color-adjustment control process according to an embodiment of the present disclosure.

Step S131, determining a maximum color-adjustment difference value of all the color-light elements included in the plurality of light-emitting units as the unit maximum color-adjustment difference value.

A light-emitting unit includes a plurality of color-light elements and, for each color-light element, the difference between the target color value and the current color value of the color-light element is the color difference value. The maximum value among the color difference values corresponding to the color-light elements of the light-emitting unit is the maximum color-adjustment difference value. That is to say, each light-emitting unit corresponds to a maximum color-adjustment difference value. Details on determining the maximum color-adjustment difference value are described with respect to Step S121, and are not repeated here.

The control unit sequentially obtains the maximum color-adjustment difference value corresponding to each light-emitting unit, and the control unit selects the largest color-adjustment difference value from the maximum color-adjustment difference values of the plurality of light-emitting units as the unit maximum color-adjustment difference value. For example, if the maximum color-adjustment difference value of the first light-emitting unit is 60, the maximum color-color difference value of the second light-emitting unit is 190, and the maximum color-color difference value of the third light-emitting unit is 120, i.e., the maximum color-adjustment difference value of the second light-emitting unit is greater than the maximum color-adjustment differences of the first light-emitting unit and the third light-emitting unit. Thus, the maximum color-color difference of the second light-emitting unit is the unit maximum color-adjustment difference of the units.

Step S132, normalizing the maximum color-adjustment difference value of each light-emitting unit according to the unit maximum color-adjustment difference value, and obtaining the second color-adjustment ratio coefficient corresponding to each light-emitting unit.

After the control unit obtains the unit maximum color-adjustment difference value and the maximum color-adjustment difference value corresponding to each light-emitting unit, the control unit calculates the second color-adjustment ratio coefficient corresponding to each light-emitting unit using the maximum color-adjustment difference value corresponding to each light-emitting unit and the unit maximum color-adjustment difference value. The second color-adjustment ratio coefficient corresponding to each light-emitting unit is the same or different. Further, the second color-adjustment ratio coefficient is normalized so that the second color-adjustment ratio coefficient is a readable value.

The second color-adjustment ratio coefficient is correlated with the unit color-adjustment value of each color-light element of the light-emitting unit, and also with the color adjustment of multiple light-emitting units of the lamp, so that each color-light element of the multiple light-emitting units of the lamp can be color-adjusted for the same number of times. This may avoid color changes in the color adjustment process due to the difference in the number of color adjustments of the respective color-light elements among multiple light-emitting units, affecting the lighting effect of the lamp. In one embodiment, the second color-adjustment ratio coefficient is obtained using division calculation or variance calculation or standard deviation calculation.

In one embodiment, the maximum color-adjustment difference value of each light-emitting unit is divided by the unit maximum color-adjustment difference value to obtain the second color-adjustment ratio coefficient corresponding to each light-emitting unit. Further, in order to facilitate the usage of the second color-adjustment ratio coefficient, the second color-adjustment ratio coefficient is normalized to the numerical space of [0, 1]. For example, if the maximum color-adjustment difference value of the light-emitting unit is 60, and the unit maximum color-adjustment difference value is 190, the second color-adjustment ratio coefficient corresponding to the light-emitting unit is 60/190.

Step S133, calculating a product of the preset color-adjustment step length and the weight of each color-light element of each light-emitting unit as the unit color-adjustment value of the corresponding color-light element. The weight includes the first color adjustment ratio coefficient of the color-light element, and the second color-adjustment ratio coefficient corresponding to the light-emitting unit to which the color-light element belongs.

After the control unit obtains the first color-adjustment ratio coefficient corresponding to the color-light element and the second color-adjustment ratio coefficient corresponding to the light-emitting unit containing the color-light element, the control unit calculates a weight based on the first color-adjustment ratio coefficient and the second color-adjustment ratio coefficient, and calculates the unit color-adjustment value of the color-light element by multiplying the color-adjustment step length by the weight of the color-light element. The unit color-adjustment value is correlated with each color-light element of each light-emitting unit through the second color color-adjustment ratio coefficient, so that each color-light element of each light-emitting unit is related to each other, and each color-light element of multiple light-emitting units performs the same number of color adjustments, avoiding the gradual color change of multiple light-emitting units of the lamp during the color adjustment process, affecting visual effects.

For example, when the first color-adjustment ratio coefficient corresponding to the red color-light element is 1/2, the second color-adjustment ratio coefficient corresponding to the red color-light element is 1/3, and the preset color-adjustment step length is 10, the corresponding weight of the red color-light element is 1/2*1/3=1/6, and the corresponding unit color-adjustment value of the red light color-light element is 1/6*10=5/3, that is to say, the red color-light element adjusts 5/3 values each time it is color adjusted.

Step S14, synchronously controlling each color-light element to implement at least one color adjustment with its respective unit color-adjustment value, and adjusting each color-light element to emit a color light corresponding to the target color parameter.

After the control unit acquires the unit color-adjustment value corresponding to each color-light element of the light-emitting units, the control unit synchronously controls the plurality of color-light elements to perform color adjustment based on the unit color-adjustment value corresponding to each color-light element. Because the unit color-adjustment value of the color-light element is calculated and obtained through the first color-adjustment ratio coefficient, or the first color-adjustment ratio coefficient and the second color-adjustment ratio coefficient, each color-light element of the light-emitting unit(s) is adjusted based on the respective unit color-adjustment value by performing the same number of color adjustment steps to reach the corresponding target color value from the current color value. Thus, there is no one or more color-light elements of the light-emitting unit(s) to complete the color adjustment in advance of others during the color adjustment process, thereby avoiding various color changes in the light-emitting unit during the color adjustment process, which affects the visual effect of the light emitted by the light-emitting unit during the color adjustment process.

Figure 5:
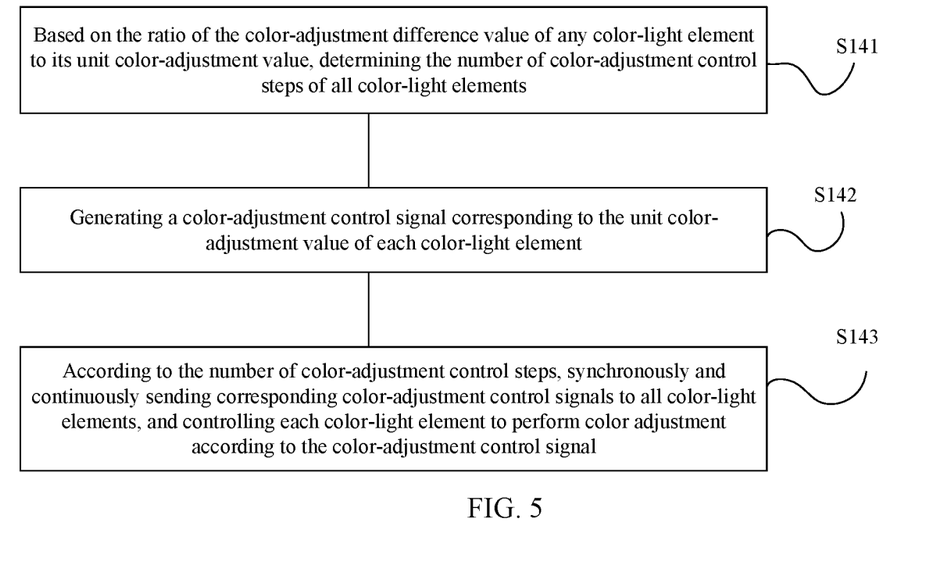
FIG. 5 illustrates a schematic flowchart of Step S14 of the lighting color-adjustment control process according to an embodiment of the present disclosure.

More specifically, referring to FIG. 5, Step S14 includes the following steps.

Step S141, based on the ratio of the color-adjustment difference value of any color-light element to its unit color-adjustment value, determining the number of color-adjustment control steps of all color-light elements.

After the control unit obtains the color-adjustment difference value and the unit color-adjustment value corresponding to the color-light element, the control unit divides the color-adjustment difference value by the unit color-adjustment value to obtain the number of color-adjustments or color-adjustment control steps of the color-light element from the current color value to its target color value. Because the respective first color-adjustment ratio coefficients, or the first color-adjustment ratio coefficients and the second color-adjustment ratio coefficients of the color-light elements of the light-emitting unit(s) are correlated, the multiple color-light elements of the light-emitting unit, and even the multiple color-light elements of the multiple light-emitting units of the lamp, can have the same number of color-adjustments or color-adjustment control steps, so that each color-light element of the light-emitting unit(s) is controlled synchronously to adjust the color until each color-light element completes the color adjustment. Thus, during the color adjustment process, there will be no one or more of the color-light elements complete the color adjustment in advance of others, avoiding various color changes of the light-emitting unit(s) during the color adjustment process, which affects the lighting effect.

Step S142, generating a color-adjustment control signal corresponding to the unit color-adjustment value of each color-light element.

After the control unit obtains the corresponding unit color-adjustment value of each color-light element, the control unit synchronously outputs a color-adjustment control signal containing the corresponding unit color-adjustment value to each color-light element. Each color-light element receives the color-adjustment control signal containing the corresponding unit color-adjustment value, and changes the color value to perform the color adjustment.

In one embodiment, the control unit is electrically connected to each color-light element through different circuits, and the control unit sends a pulse signal to each color-light element to control the color-light element to perform color adjustment. For example, the dimming method is PWM (pulse width modulation) dimming, using a plurality of different circuits to realize the switching of the forward LED track light current, and controlling the voltage of the dimming control pin of the power supply chip by adjusting the pulse width of the dimming PWM signal to achieve the purpose of dimming or color adjustment.

Step S143, according to the number of color-adjustment control steps, synchronously and continuously sending corresponding color-adjustment control signals to all color-light elements, and controlling each color-light element to perform color adjustment according to the color-adjustment control signal.

After the control unit obtains the number of color adjustments or color-adjustment control steps of a color-light element, that is, all or overall color-adjustment control steps, the control unit simultaneously sends corresponding color-adjustment control signals to all the color-light elements, and controls each color-light element according to the corresponding unit color-adjustment value of the color-adjustment control signal to perform color adjustment. The color-adjustment of all color-light elements is completed by the number of color-adjustment control steps, so that one or more color-light elements of the light-emitting unit will not complete the color adjustment in advance of others during the toning process. Further, the unit color-adjustment values of the color-light elements are correlated through the first color-adjustment ratio coefficient, or the first color-adjustment ratio coefficient and the second color-adjustment ratio coefficient, the amount of color adjustment of the color-light elements are also correlated, preventing one or more color-light elements from having overly large amount of color adjustment, which affects the color adjustment effect of the light-emitting unit(s).

Figure 6:
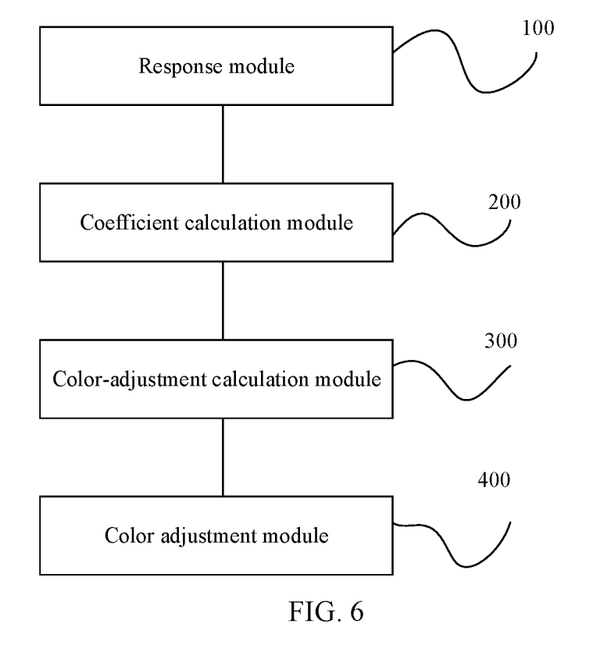
FIG. 6 illustrates a schematic structural diagram of a lighting color-adjustment control device according to an embodiment of the present disclosure.

The present disclosure also provides a lighting color-adjustment control device. Referring to FIG. 6, the device includes a response module 100, a coefficient calculation module 200, a color-adjustment calculation module 300, and a color adjustment module 400, etc.

The response module 100 is configured for, in response to the lighting color-adjustment instruction, determining the target color parameter corresponding to the instruction. The color parameter includes the color values corresponding to multiple color-light elements.

The coefficient calculation module 200 is configured for, according to the target color parameter and the current color parameter corresponding to the plurality of color-light elements, determining a first color-adjustment ratio coefficient of each color-light element.

The color-adjustment calculation module 300 is configured for determining the unit color-adjustment value of each color-light element. The unit color-adjustment value of each color-light element is the result of a preset color-adjustment step length matched with a corresponding weight, and the weight includes the first color-adjustment ratio coefficient of the color-light element.

The color adjustment module 400 is configured for synchronously controlling each color-light element to implement at least one color adjustment with its respective unit color-adjustment value, and adjusting each color-light element to emit a color light corresponding to the target color parameter.

The present disclosure also provides a storage medium storing computer-readable instructions. When the computer-readable instructions are executed by one or more processors, the one or more processors are configured to perform a lighting color-adjustment control method according to various embodiments of the present disclosure.

The present disclosure also provides a computer program product containing computer programs/instructions, and when the computer programs/instructions are executed by one or more processors, the lighting color-adjustment control method according to various embodiments of the present disclosure can be implemented.

Those of ordinary skill in the art can understand that all or part of the processes in the various embodiments of the present disclosure can be realized by instructing related hardware through a computer program, and the computer program can be stored in a computer-readable storage medium. When the program is executed, the processes of the embodiments of the present disclosure can be implemented. The storage medium may be a computer-readable storage medium such as a magnetic disk, an optical disk, a read-only memory (ROM), or a random access memory (RAM), etc.

Those skilled in the art can understand that the various operations, methods, and steps, measures, and schemes in the processes that have been discussed in this disclosure can be replaced, changed, combined, or deleted. Furthermore, the various operations, methods, and other steps, measures, and schemes in the process that have been discussed in this disclosure can also be replaced, changed, rearranged, decomposed, combined, or deleted. Further, steps, measures, and schemes in the prior art that have operations, methods, and processes disclosed in the present application may also be alternated, changed, rearranged, decomposed, combined, or deleted.

Finally, it should be noted that: the above embodiments are only used to illustrate the technical solutions of the present disclosure, but not to limit the present disclosure. Although the present disclosure has been described in detail with reference to the foregoing embodiments, those of ordinary skill in the art should understand that modifications can be made to the technical solutions described in the foregoing embodiments, or equivalent replacements are made to some of the technical features; and these modifications or replacements do not drive the essence of the corresponding technical solutions away from the spirit and scope of the technical solutions of the various embodiments of the present disclosure.

What is claimed is:

1. A lighting color-adjustment control method for a lamp containing at least one light-emitting unit, each having a plurality of color-light elements, the method comprising:
   in response to a lighting color-adjustment instruction, determining a target color parameter corresponding to the lighting color-adjustment instruction, the color parameter including color values corresponding to the plurality of color-light elements;
   according to the target color parameter and a current color parameter corresponding to the plurality of color-light elements, determining a first color-adjustment ratio coefficient of each color-light element;
   determining a unit color-adjustment value of each color-light element, the unit color-adjustment value of each color-light element being a result of a preset color-adjustment step length matched with a corresponding weight, and the weight including the first color-adjustment ratio coefficient; and
   synchronously controlling each color-light element to implement at least one color adjustment with the respective unit color-adjustment value to adjust each color-light element to emit a color light corresponding to the target color parameter, wherein the current color parameter is sequentially adjusted to the target color parameter in a plurality of color-adjustment steps each adjusting the corresponding unit color-adjustment value.

2. The method according to claim 1, wherein the determining a first color-adjustment ratio coefficient of each color-light element further comprises:
   based on the target color parameter and the current color parameter, calculating a color-adjustment difference value required to change a color value of each color-light element, and determining a maximum color-adjustment difference value; and
   normalizing the color-adjustment difference value of each color-light element according to the maximum color-adjustment difference value, and obtaining the first color-adjustment ratio coefficient corresponding to each color-light element.

3. The method according to claim 2, wherein the determining the unit color-adjustment difference value of each color-light element further comprises:
   determining a maximum color-adjustment difference value of all the color-light elements included in the at least one light-emitting unit as a unit maximum color-adjustment difference value;
   normalizing the maximum color-adjustment difference value of each light-emitting unit according to the unit maximum color-adjustment difference value, and obtaining a second color-adjustment ratio coefficient corresponding to each light-emitting unit used to make color adjustment of an individual light-emitting unit consistent with color adjustment of the plurality of light-emitting units; and
   calculating a product of the preset color-adjustment step length and the weight of each color-light element of each light-emitting unit as the unit color-adjustment value of the corresponding color-light element, wherein the weight includes the first color adjustment ratio coefficient of the color-light element and the second color-adjustment ratio coefficient corresponding to the light-emitting unit to which the color-light element belongs.

4. The method according to claim 3, wherein the obtaining a second color-adjustment ratio coefficient corresponding to each light-emitting unit further comprises:
   dividing the maximum color-adjustment difference value of each light-emitting unit by the unit maximum color-adjustment difference value to obtain the second color-adjustment ratio coefficient corresponding to each light-emitting unit, and normalizing the second color-adjustment ratio coefficient to a value space of [0, 1].

5. The method according to claim 2, wherein the synchronously controlling each color-light element to implement at least one color adjustment with the respective unit color-adjustment value to adjust each color-light element to emit a color light corresponding to the target color parameter further comprises:
   based on the ratio of the color-adjustment difference value of a color-light element to its unit color-adjustment value, determining a total number of the plurality of color-adjustment control steps of the color-light elements;
   generating a color-adjustment control signal corresponding to the unit color-adjustment value of each color-light element;
   according to the total number of the plurality of color-adjustment control steps, synchronously and continuously sending corresponding color-adjustment control signal to each color-light element, and controlling each color-light element to perform color adjustment according to the color-adjustment control signal corresponding to the unit color-adjustment value of each color-light element.

6. The method according to claim 2, wherein the normalizing the color-adjustment difference value of each color-light element according to the maximum color-adjustment difference value, and obtaining the first color-adjustment ratio coefficient corresponding to each color-light element further comprises:
   dividing the color-adjustment difference value of each color-light element by the maximum color-adjustment difference value to obtain the corresponding first color-adjustment ratio coefficient, and normalizing all the first color-adjustment ratio coefficients to a value space of [0, 1].

7. The method according to claim 1, wherein a light-emitting unit comprises three color-light elements used to emit red, green, and blue color light respectively.

8. The method according to claim 1, wherein the unit color-adjustment value belongs to an integer value space of 0 to 255, and the color-adjustment step length belongs to an integer value space of 1 to 20.

9. A lamp, comprising:
a dimmer; a control unit; and a plurality of light-emitting units,
wherein:
the dimmer is used to output a lighting color-adjustment instruction to the control unit,
each light-emitting unit includes a plurality of color-light elements,
the control unit is electrically connected to each color-light element of the light-emitting units, and
the control unit is configured to perform:
in response to a lighting color-adjustment instruction, determining a target color parameter corresponding to the lighting color-adjustment instruction, the color parameter including color values corresponding to the plurality of color-light elements;
according to the target color parameter and a current color parameter corresponding to the plurality of color-light elements, determining a first color-adjustment ratio coefficient of each color-light element;
determining a unit color-adjustment value of each color-light element, the unit color-adjustment value of each color-light element being a result of a preset color-adjustment step length matched with a corresponding weight, and the weight including the first color-adjustment ratio coefficient; and
synchronously controlling each color-light element to implement at least one color adjustment with the respective unit color-adjustment value to adjust each color-light element to emit a color light corresponding to the target color parameter, wherein the current color parameter is sequentially adjusted to the target color parameter in a plurality of color-adjustment steps each adjusting the corresponding unit color-adjustment value.

10. The lamp according to claim 9, wherein the determining a first color-adjustment ratio coefficient of each color-light element further comprises:
based on the target color parameter and the current color parameter, calculating a color-adjustment difference value required to change a color value of each color-light element, and determining a maximum color-adjustment difference value; and
normalizing the color-adjustment difference value of each color-light element according to the maximum color-adjustment difference value, and obtaining the first color-adjustment ratio coefficient corresponding to each color-light element.

11. The lamp according to claim 10, wherein the determining the unit color-adjustment difference value of each color-light element further comprising:
determining a maximum color-adjustment difference value of all the color-light elements included in the light-emitting units as a unit maximum color-adjustment difference value;
normalizing the maximum color-adjustment difference value of each light-emitting unit according to the unit maximum color-adjustment difference value, and obtaining a second color-adjustment ratio coefficient corresponding to each light-emitting unit used to make color adjustment of an individual light-emitting unit consistent with color adjustment of the plurality of light-emitting units; and
calculating a product of the preset color-adjustment step length and the weight of each color-light element of each light-emitting unit as the unit color-adjustment value of the corresponding color-light element, wherein the weight includes the first color adjustment ratio coefficient of the color-light element and the second color-adjustment ratio coefficient corresponding to the light-emitting unit to which the color-light element belongs.

12. The lamp according to claim 10, wherein the synchronously controlling each color-light element to implement at least one color adjustment with the respective unit color-adjustment value to adjust each color-light element to emit a color light corresponding to the target color parameter further comprises:
based on the ratio of the color-adjustment difference value of a color-light element to its unit color-adjustment value, determining a total number of the plurality of color-adjustment control steps of the color-light elements;
generating a color-adjustment control signal corresponding to the unit color-adjustment value of each color-light element;
according to the total number of the plurality of color-adjustment control steps, synchronously and continuously sending corresponding color-adjustment control signal to each color-light element, and controlling each color-light element to perform color adjustment according to the color-adjustment control signal corresponding to the unit color-adjustment value of each color-light element.

13. The lamp according to claim 10, wherein the normalizing the color-adjustment difference value of each color-light element according to the maximum color-adjustment difference value, and obtaining the first color-adjustment ratio coefficient corresponding to each color-light element further comprises:
dividing the color-adjustment difference value of each color-light element by the maximum color-adjustment difference value to obtain the corresponding first color-adjustment ratio coefficient, and normalizing all the first color-adjustment ratio coefficients to a value space of [0, 1].

14. The lamp according to claim 9, wherein a light-emitting unit comprises three color-light elements used to emit red, green, and blue color light respectively.

15. The lamp according to claim 9, wherein the unit color-adjustment value belongs to an integer value space of 0 to 255, and the color-adjustment step length belongs to an integer value space of 1 to 20.

16. The lamp according to claim 8, wherein, using a plurality of different circuits, the control unit sends a pulse signal to each color-light element to control the color-light element to perform color adjustment via a pulse width modulation (PWM) dimming method.

17. A non-transitory computer-readable storage medium containing computer-executable instructions for, when executed by one or more processors, performing a lighting color-adjustment control method for a lamp containing at least one light-emitting unit, each having a plurality of color-light elements, the method comprising:
in response to a lighting color-adjustment instruction, determining a target color parameter corresponding to the lighting color-adjustment instruction, the color parameter including color values corresponding to the plurality of color-light elements;
according to the target color parameter and a current color parameter corresponding to the plurality of color-light elements, determining a first color-adjustment ratio coefficient of each color-light element;

determining a unit color-adjustment value of each color-light element, the unit color-adjustment value of each color-light element being a result of a preset color-adjustment step length matched with a corresponding weight, and the weight including the first color-adjustment ratio coefficient; and synchronously controlling each color-light element to implement at least one color adjustment with the respective unit color-adjustment value to adjust each color-light element to emit a color light corresponding to the target color parameter, wherein the current color parameter is sequentially adjusted to the target color parameter in a plurality of color-adjustment steps each adjusting the corresponding unit color-adjustment value.

18. The non-transitory computer-readable storage medium according to claim 17, wherein the determining a first color-adjustment ratio coefficient of each color-light element further comprises:

based on the target color parameter and the current color parameter, calculating a color-adjustment difference value required to change a color value of each color-light element, and determining a maximum color-adjustment difference value; and normalizing the color-adjustment difference value of each color-light element according to the maximum color-adjustment difference value, and obtaining the first color-adjustment ratio coefficient corresponding to each color-light element.

19. The non-transitory computer-readable storage medium according to claim 18, wherein the determining the unit color-adjustment difference value of each color-light element further comprises:

determining a maximum color-adjustment difference value of all the color-light elements included in the at least one light-emitting unit as a unit maximum color-adjustment difference value;

normalizing the maximum color-adjustment difference value of each light-emitting unit according to the unit maximum color-adjustment difference value, and obtaining a second color-adjustment ratio coefficient corresponding to each light-emitting unit used to make color adjustment of an individual light-emitting unit consistent with color adjustment of the plurality of light-emitting units; and calculating a product of the preset color-adjustment step length and the weight of each color-light element of each light-emitting unit as the unit color-adjustment value of the corresponding color-light element, wherein the weight includes the first color adjustment ratio coefficient of the color-light element and the second color-adjustment ratio coefficient corresponding to the light-emitting unit to which the color-light element belongs.

* * * * *